(12) United States Patent
Willenborg

(10) Patent No.: US 9,071,810 B2
(45) Date of Patent: *Jun. 30, 2015

(54) POV VIDEO MOUNTING SYSTEM

(75) Inventor: John Willenborg, Novato, CA (US)

(73) Assignee: Fellowes, Inc., Itasca, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/411,516

(22) Filed: Mar. 2, 2012

(65) Prior Publication Data

US 2013/0251330 A1    Sep. 26, 2013

Related U.S. Application Data

(60) Provisional application No. 61/448,960, filed on Mar. 3, 2011.

(51) Int. Cl.
*H04M 1/00*  (2006.01)
*H04N 9/79*  (2006.01)
*H04N 5/765*  (2006.01)
*H04N 101/00* (2006.01)

(52) U.S. Cl.
CPC ........... *H04N 9/79* (2013.01); *H04N 5/765* (2013.01); *H04N 2101/00* (2013.01)

(58) Field of Classification Search
CPC ..... H04B 1/3888; H04M 1/0283; H04M 1/18
USPC ............ 455/575.1, 575.8, 575.2, 575.6, 557; 396/419–429, 25, 27, 29, 535, 544; 312/223.1; 359/511

See application file for complete search history.

(56) References Cited

U.S. PATENT DOCUMENTS

| 7,464,814 | B2 * | 12/2008 | Carnevali | 206/320 |
| 2007/0280677 | A1 * | 12/2007 | Drake et al. | 396/429 |
| 2008/0131106 | A1 * | 6/2008 | Bruce | 396/25 |
| 2010/0061711 | A1 * | 3/2010 | Woodman | 396/428 |

* cited by examiner

*Primary Examiner* — Marcos Torres
(74) *Attorney, Agent, or Firm* — Herbert T. Patty

(57) ABSTRACT

A system, method, and apparatus are disclosed. The POV video mounting system described herein includes a casing assembly and a mounting assembly. The casing assembly is operable to fit an electronic device therein wherein the electronic device has video recording and video display capability. The mounting assembly is coupled to said casing assembly and operable to mount the apparatus to sports equipment.

20 Claims, 13 Drawing Sheets

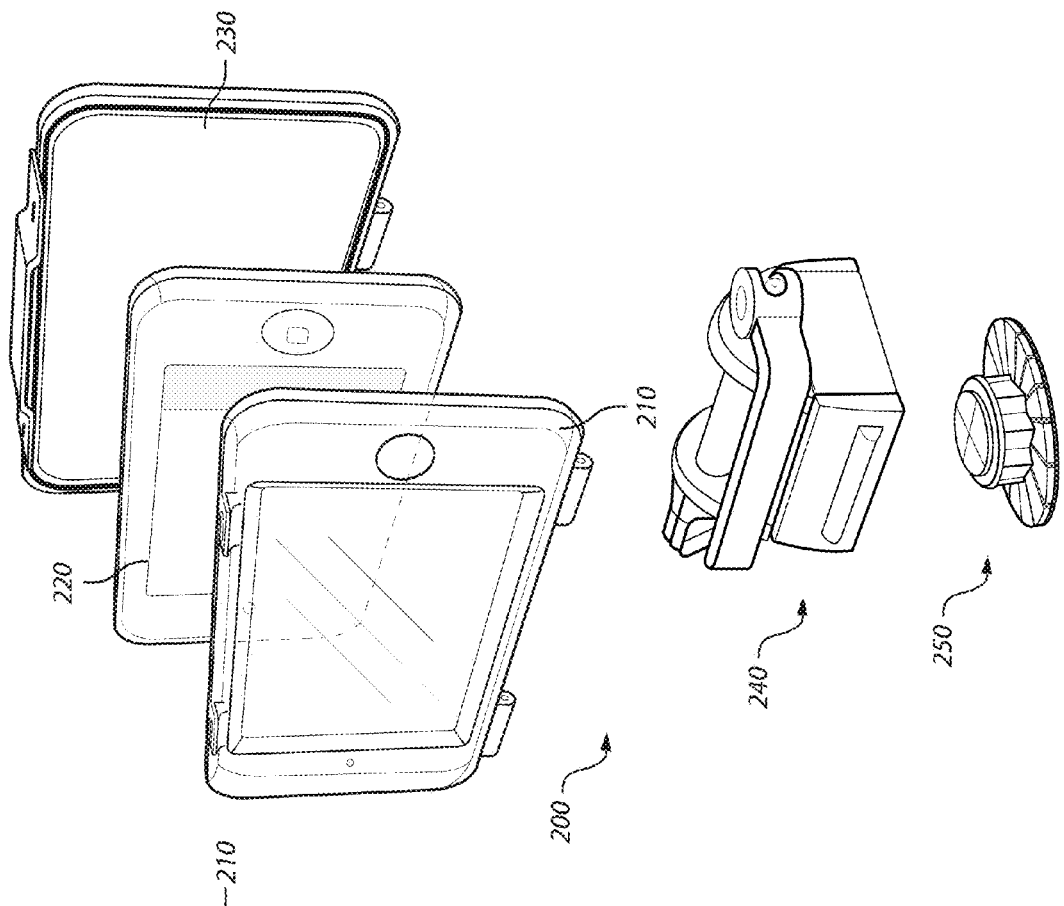
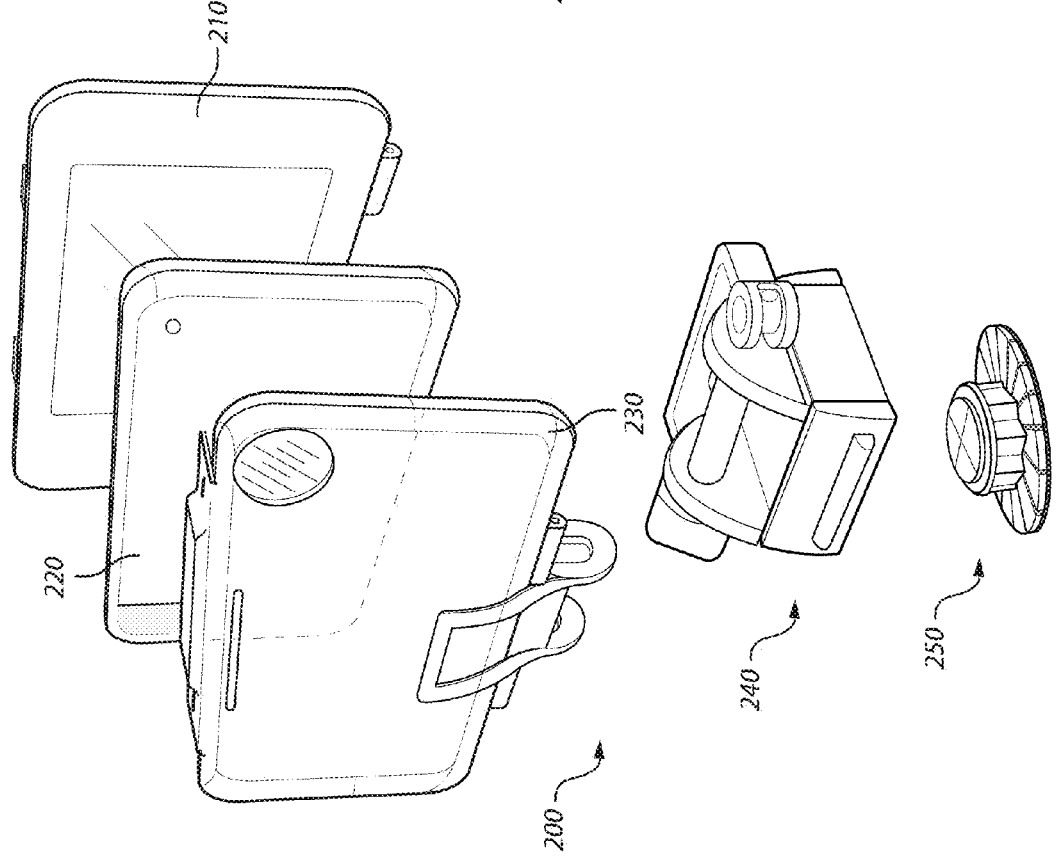

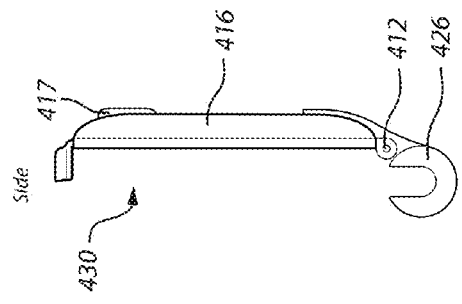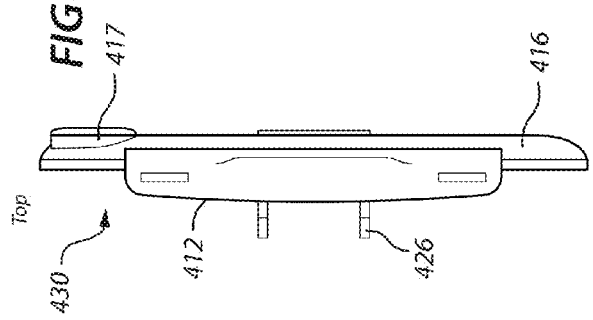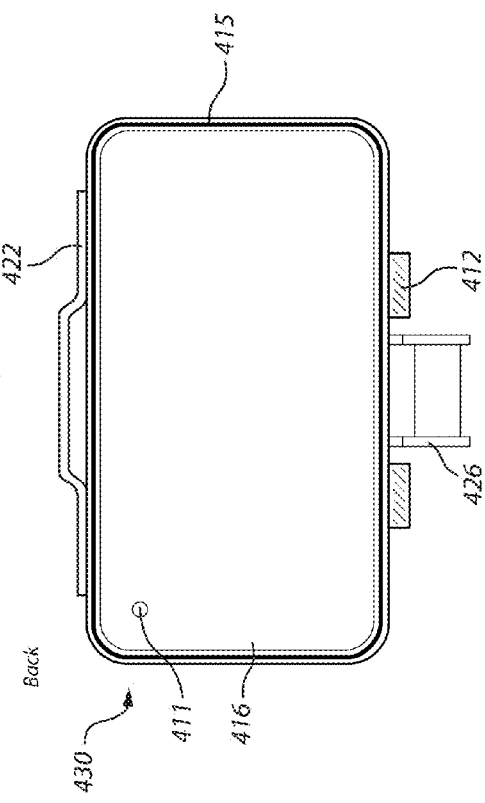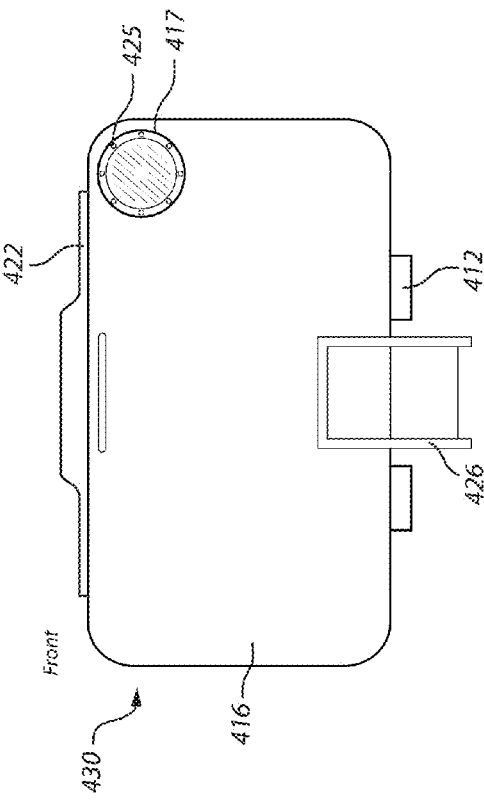

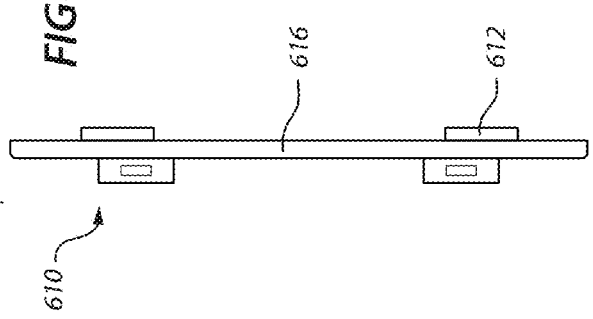
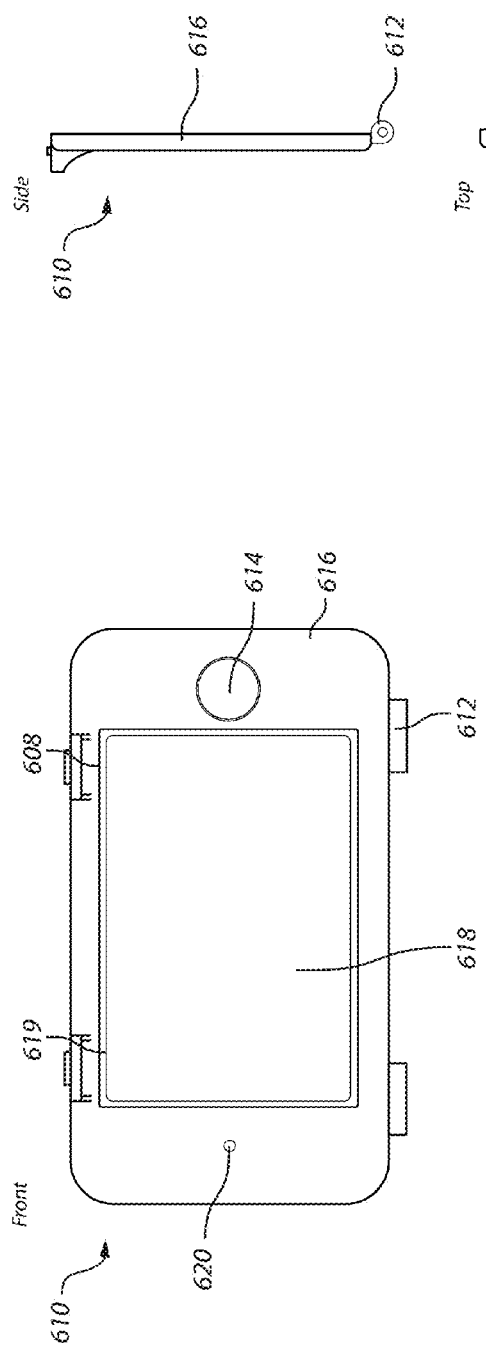
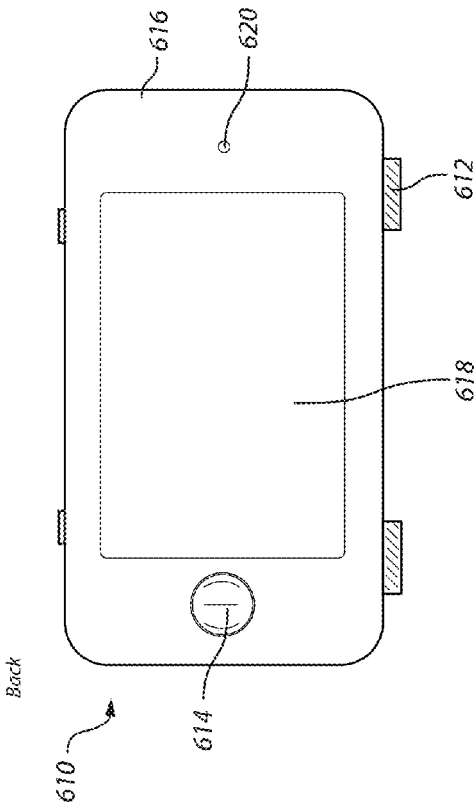

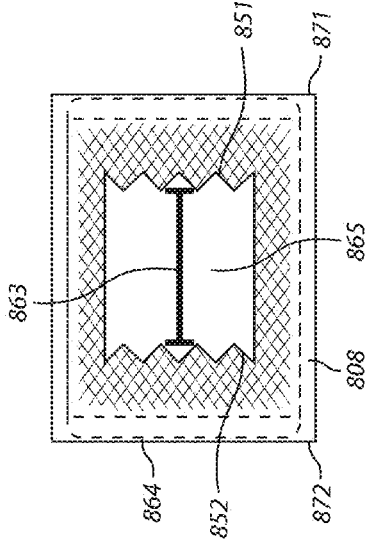
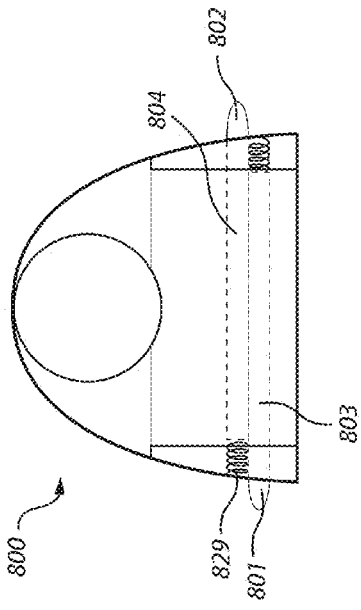
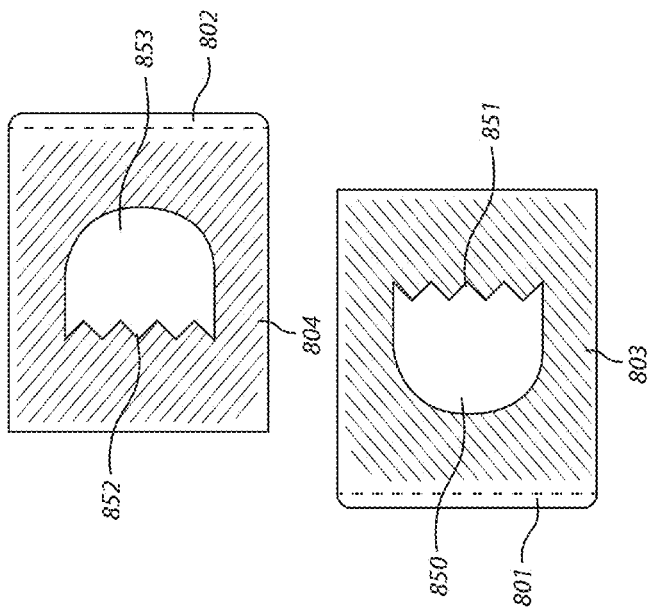
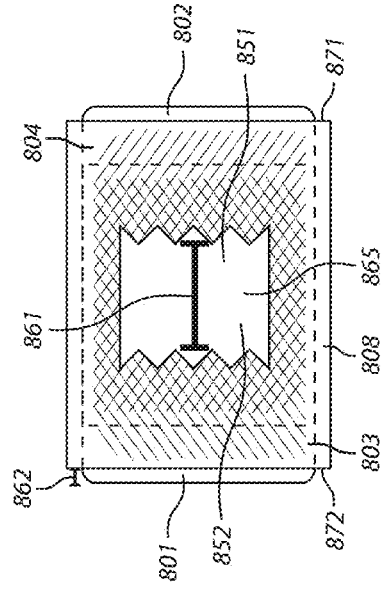

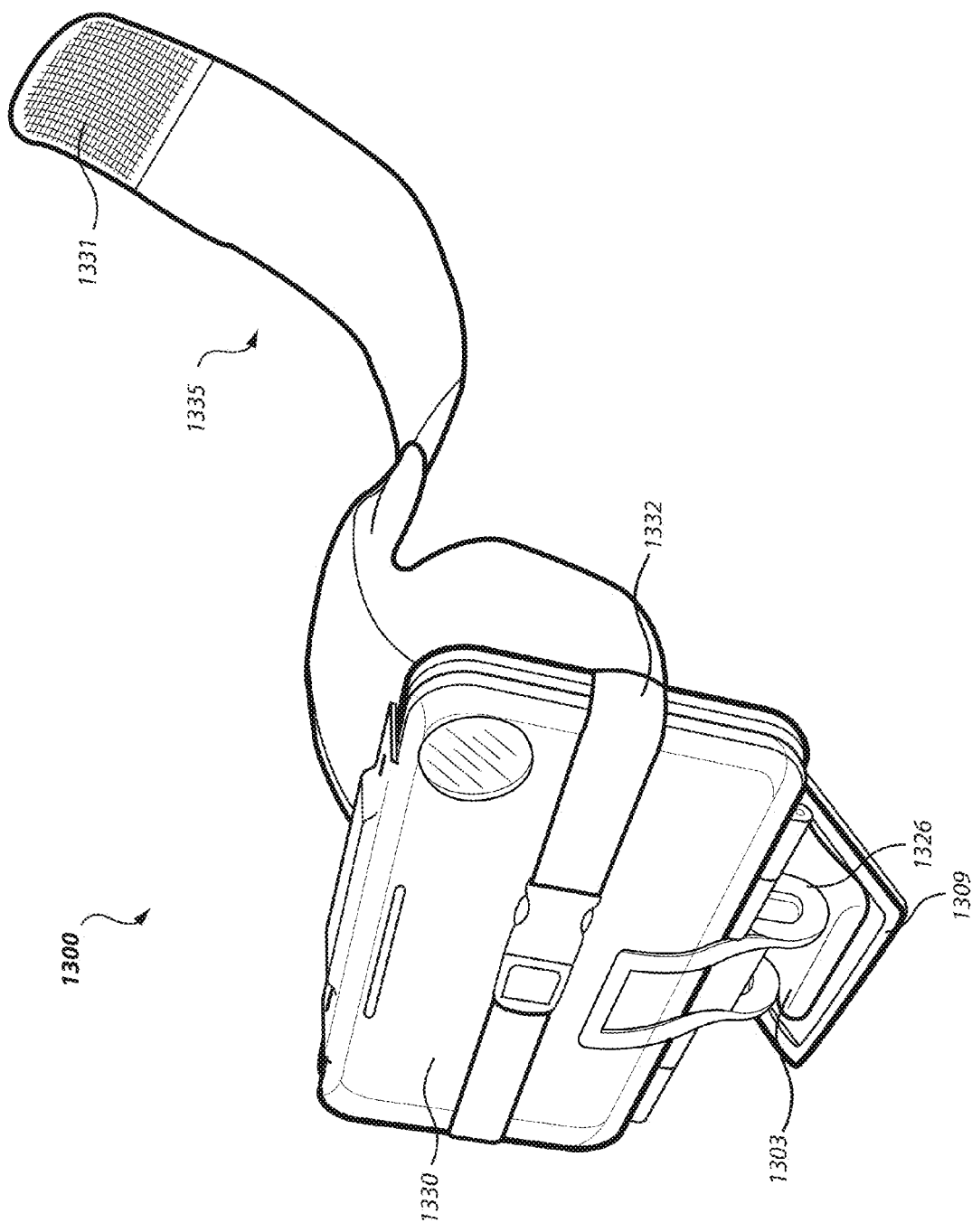

POV VIDEO MOUNTING SYSTEM

FIELD OF INVENTION

This invention relates generally to a point of view (POV) video mounting system, and more specifically to a system and method of mounting a video recording device to a mobile surface to record one's performance.

BACKGROUND OF INVENTION

Mounted video camera recording systems have been in existence for a few years. For example, POV cameras have been used for film and television production and for capturing one's action sports performance. For example, POV video mounting system provider GoPro has sold numerous POV video mounting systems which allow sports enthusiasts to record their performance.

However, POV systems of the prior art have many limitations to their video recording performance. For example, users of current POV cameras often have no ability to view recorded video on the device during operation. Furthermore, the lack of a viewable screen inhibits the user to properly aim or operate the camera. A user may discover after a ride that his/her recording is useless since he/she unknowingly recorded the pavement, ground, or captured other non-useful video footage. Accordingly, prior art POV systems fail to enable users of POV cameras the ability to view the input thereto during operation.

Further, many POV systems of the prior art make it difficult for users to determine the power status of the cameras. As such, during operation it is difficult for users to determine whether the camera is recording until after the user downloads the recording and views the footage. For example, the "power on" signals on the camera of some prior art POV systems are counterintuitive and therefore users have no logical means to determine whether the video camera is recording during operation without reading the user manual. Moreover, some of the "power on" signals of prior art POV systems are weak which also makes it difficult for users to determine the power status of the device. Accordingly, the inability to accurately determine the power status of POV systems may jeopardize a user's opportunity to record their performance.

Furthermore, prior art POV systems are limited in that they restrict the user's ability to have only a single degree of movement. In other words, POV systems allow the video camera to move in only one direction. As such, once a POV system is attached to a surface, only the video recording component of the system can move back and forth, however, restricting the system from rotating.

In addition, prior art POV system typically do not include internal rechargeable batteries or storage. Accordingly, users of prior art POV systems have a limited time to operate them and thus risk losing valuable video footage for lack of adequate power. Moreover, many POV systems can not accommodate secure digital (SD) memory cards. As such, many POV systems can not enable users to download or upload the recorded video feeds to external applications.

POV prior art systems also exhibit poor locking mechanisms such that the cameras tend to move while attached to surfaces moving at high speeds. If a user intends to stop the camera from moving, a great amount of force must be expended and/or specialized tools utilized to fasten the devices. For example, when an user is driving a motorbike at high speeds, with a POV system attached thereto, vibration causes the camera to move from their original position of attachment. Accordingly, the video recording field of view is compromised, thereby perturbing the video footage recording, which is undesirable to users.

To this end, there is a need for a POV video mounting system which addresses the aforementioned limitations of prior art POV systems.

SUMMARY OF THE INVENTION

A system, method, and apparatus are disclosed. The POV video mounting system described herein includes a casing assembly and a mounting assembly. The casing assembly is operable to fit an electronic device therein wherein the electronic device has video recording and video display capability. The mounting assembly is coupled to said casing assembly and operable to mount the apparatus to sports equipment.

BRIEF DESCRIPTION OF THE DRAWINGS

FIG. 2A is an exploded front view of a POV video mounting system in accordance with a system and method of the present invention.

FIG. 2B is an exploded back view of a POV video mounting system in accordance with a system and method of the present invention.

FIG. 4A illustrates a back view of a back casing plate in accordance with a system and method of the present invention.

FIG. 4B illustrates a front view of the back casing plate in accordance with a system and method of the present invention.

FIG. 4C illustrates a side view of the back casing plate in accordance with a system and method of the present invention.

FIG. 4D illustrates a top view of the back casing plate in accordance with a system and method of the present invention.

FIG. 6A illustrates a front view of a front casing plate in accordance with a system and method of the present invention.

FIG. 6B illustrates a back view of the front casing plate in accordance with a system and method of the present invention.

FIG. 6C illustrates a side view of the front casing plate in accordance with a system and method of the present invention.

FIG. 6D illustrates a top view of the front casing plate in accordance with a system and method of the present invention.

FIG. 8A is a perspective view of spring-loaded members in accordance with a system and method of the present invention.

FIG. 8B is a top cross-sectional view of the spring-loaded members when the first locking mechanism is engaged.

FIG. 8C is a top cross-sectional view of the spring-loaded members when the first locking mechanism is disengaged.

FIG. 8D is side a cross-sectional view of the spring-loaded members when the first locking mechanism is disengaged.

FIG. 13 illustrates a perspective view of a POV video mounting system coupled to a wrist mount in accordance with a system and method of the present invention.

RELATED APPLICATION

The present application claims the benefit of priority under 35 U.S.C. 119(e) to U.S. Provisional Application Ser. No. 61/448,960, entitled "POINT OF VIEW VIDEO MOUNTING SYSTEM" filed Mar. 3, 2011, which is expressly incorporated by reference herein.

DETAILED DESCRIPTION

This invention relates generally to POV video mounting systems, and more specifically to a system and method of mounting a video recording device to a mobile surface to record one's performance. The following description is presented to enable one having ordinary skill in the art to make and use the embodiment described herein and is provided in the context of a patent application. The generic principles and features described herein will be apparent to those skilled in the art. Thus, the present embodiment is not intended to be limited to the embodiments shown, but is to be accorded the widest scope consistent with the principles and features described herein.

A system, method, and apparatus are disclosed. The POV video mounting system described herein includes an impact resistant, water tight casing assembly which includes a front casing plate and a back casing plate to enclose a device therein having video recording functionality. The POV video mounting system further includes a mounting hub coupled to the casing assembly. The mounting hub serves as a platform for the enclosed device and includes a first locking component which inhibits the device from rotating when engaged but allows the device to rotate when disengaged. Furthermore, the mounting hub includes a second locking mechanism which inhibits the device from moving backwards or forward when engaged but allows movement in these directions when disengaged. The POV video mounting system further includes a "top hat" component coupled to the mounting hub which allows the mounting hub to rotate when the first locking component is disengaged.

Figure 1B:
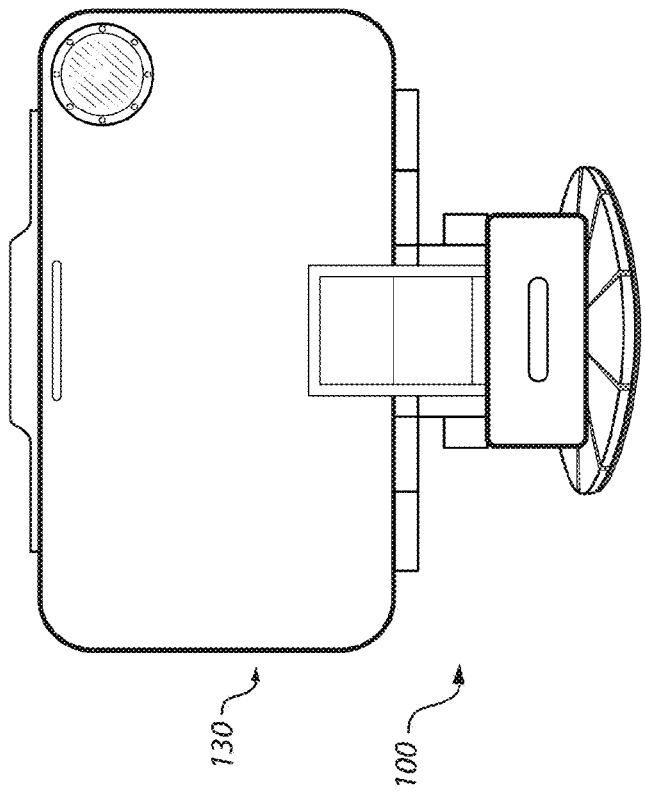
FIG. 1B is a perspective back view of a POV video mounting system in accordance with a system and method of the present invention.
Figure 1A:
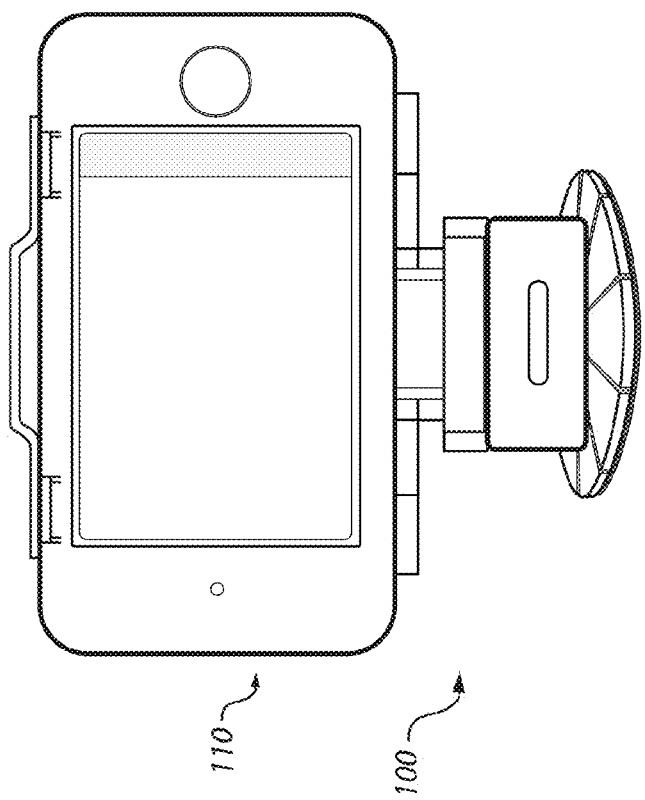
FIG. 1A is a perspective front view of a POV video mounting system in accordance with a system and method of the present invention.

FIG. 1A is a perspective front view of a POV video mounting system 100 in accordance with a system and method of the present invention. As shown, the POV video mounting system 100 is configured to be mounted. For example, POV video mounting system 100 can be mounted to sporting equipment such as motorbikes, bicycles, jet skis, race cars, etc. In addition, POV video mounting system 100 can be mounted to weapons and armored fighting vehicles. As will be described below, POV video mounting system 100 can be coupled to other mounting surfaces such as the user's person. As such, there is great versatility to where and how POV video mounting system 100 is mounted.

FIG. 1B is a perspective back view of the POV video mounting system 100 in accordance with a system and method of the present invention. As shown, an enclosed device with video recording functionality is displayed through a transparent portion of the POV video mounting system 100. Accordingly, the enclosed device is visible from the back side of the POV video mounting system 100.

Now referring to both FIG. 1A and FIG. 1B, the mounting orientation of POV video mounting system 100 can be revealed. As described, FIG. 1A illustrates the front side of POV video mounting system 100. In an embodiment, the front side of POV video mounting system 100 is characterized by back casing plate 130 facing away from the user during operation. For example, if POV video mounting system 100 is mounted to a front fender of a bicycle, the back casing plate 130 faces away from the rider and towards the rider's view. Alternatively, according to the embodiment, the back side of POV video mounting system 100 is characterized by front casing plate 110 facing towards the user when in operation. For example, if POV video mounting system 100 is mounted to a front fender of a bicycle, front casing plate 110 faces the rider. As such, if POV video mounting system 100 is visible to the user during operation, the front casing plate 110 faces the user such that the enclosed devise is visible to the user as well.

FIG. 2A illustrates an exploded front view of a POV video mounting system in accordance with a system and method of the present invention. As shown, POV video mounting system 200 includes front casing plate 210, back casing plate 230, device 220 there between, mounting hub 240 disposed under the casing assembly, and top hat component 250 there beneath. It should be understood that a POV video mounting system in accordance with the present invention is not limited to the components displayed in FIG. 2A. As such, a POV video mounting system consistent with the present invention may include all or more components than that displayed in FIG. 2A and this would be in the spirit and scope of the present invention.

FIG. 2B is an illustration of an exploded back view of a POV video mounting system in accordance with a system and method of the present invention. In particular, FIG. 2B displays POV video mounting system 200 displayed in FIG. 2A rotated 180 degrees. As shown, FIG. 2B illustrates the front side of front casing plate 210, the back side of back casing plate 230, device 220 there between, a second side of mounting hub 240 disposed under the casing assembly, and top hat component 250 there beneath. Accordingly, FIG. 2A and FIG. 2B illustrate different perspective views of POV video mounting system 200 such that the components therein may be adequately displayed.

Figure 3B:
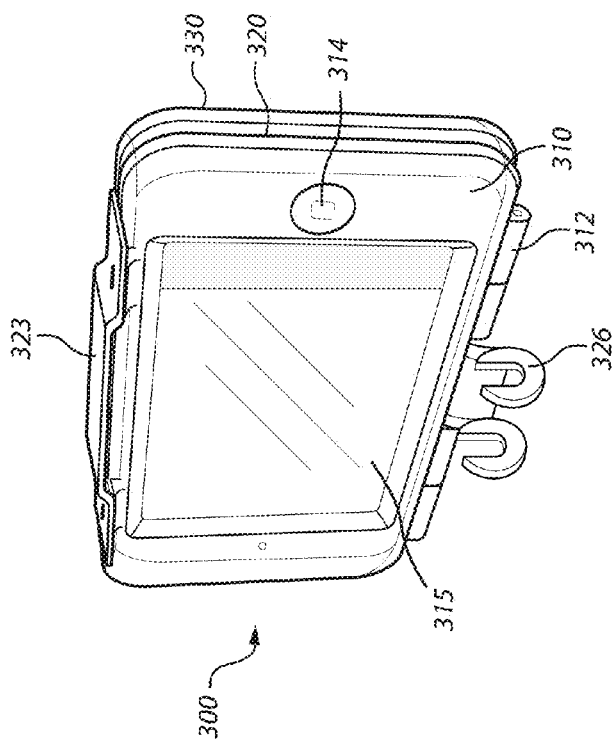
FIG. 3B is a perspective back view of the assembled casing assembly with the device secured therein, in accordance with a system and method of the present invention.
Figure 3A:
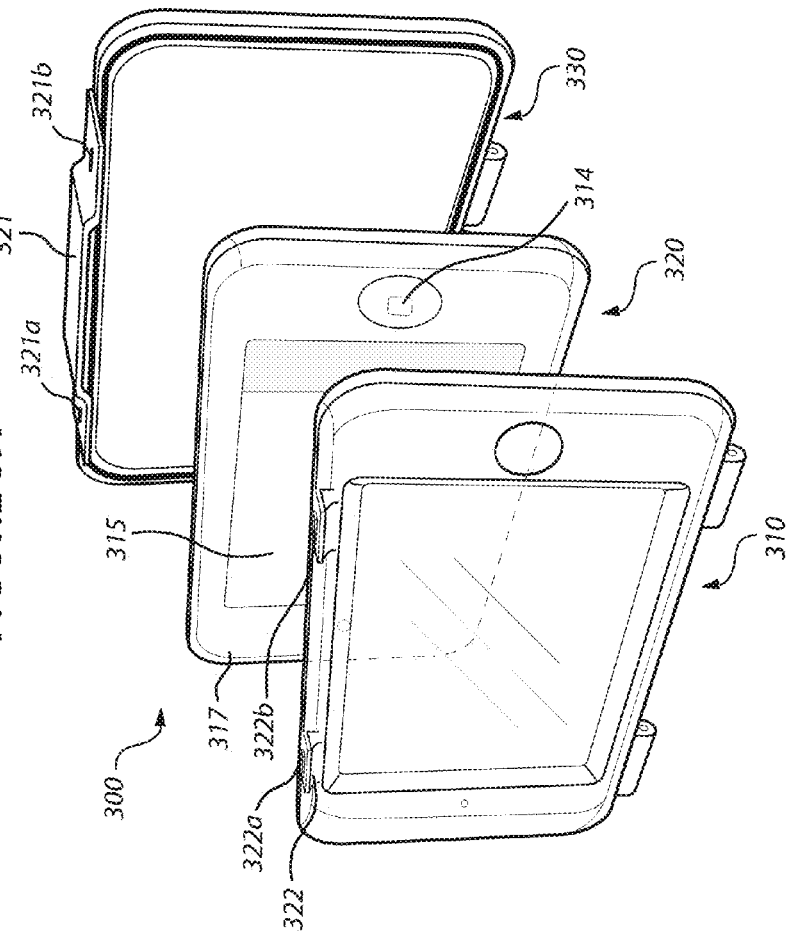
FIG. 3A is an exploded back view of a casing assembly suitable for a device with video recording functionality to be secured therein, in accordance with a system and method of the present invention.

Continuing on through the figures, FIG. 3A is an illustration of an exploded back view of a casing assembly suitable for a device with video recording functionality to be secured therein, in accordance with a system and method of the present invention. In an embodiment, the casing assembly may be characterized as when back casing plate 330 and front casing plate 310 are assembled. In yet another embodiment, the casing assembly may be characterized as when the back casing plate 330 and front casing plate 310 are assembled with device 320 secured and enclosed therein. The manner which back casing plate 330 and front casing plate 310 are assembled is described below.

As shown, FIG. 3A illustrates latch components 321, 322 extending from front casing plate 310 and back casing plate 330, respectively. Together, latch slot components 321, latch extension components 322 help secure device 320 within front casing plate 310 and back casing plate 330. In the embodiment shown, latch extension component 322 includes a pair of displaced latch extensions 322a, 322b. In the embodiment, latch extensions 322a, 322b are shaped such that they snap fit within corresponding latch slots 321a, 321b of latch slot components 321.

Device 320 includes video display 315 on the surface of its front side. In an embodiment, the video display 315 of device 320 provides high definition (HD) video recording quality to enhance the quality of the recorded video(s).

In another embodiment, device 320 includes an accelerometer (not shown) which can aid in calculating g-forces, hang time, and other performance metrics. The data obtained from the accelerometer can be saved and downloaded or displayed directly onto the video display. Users may also utilize the accelerometer data to improve their performance or simply archive for later use.

In yet another embodiment, device 320 includes a subscriber identity module (SIM) card which allows a user obtain global positioning system (GPS) coordinates. In an embodiment, GPS coordinate data can be used to determine performance metrics such as acceleration and speed in relation to the data coordinates of the user's riding trajectory. In addition, a track map or driving route can also be calculated from the combination data of the accelerometer and the GPS information.

In yet another embodiment, device 320 includes a home screen button 314 which is operable by a user. Home screen button 314 may be used by a user to initiate various functions on device 320 such as, but not limited to, powering on the device, releasing the device from a sleep or hibernating mode, stopping or pausing media playing on the device, etc. In addition, as shown in FIG. 3A, home screen button 314 is accessible to a user due to its relatively large surface area. For example, the diameter of home screen button 314 disposed on the surface of device 320 may range from 0.4 inches to 0.7 inches. It should be understood that the present invention is not limited to a home screen button and that any button or component which allows users to initiate commands to the device is within the spirit and scope of the present invention.

In an embodiment, device 320 is a cellular phone which includes video recording functionality. For example, device 320 may be an iPhone® or an iPod Touch® sold and distributed by Apple Computers, Inc., headquartered in Cupertino, Calif. It should be understood, however, that the present invention is not limited to any particular device. As such, any device which includes video recording functionality and can be assembled within casing assembly 300 is within the spirit and scope of the present invention.

FIG. 3B is a perspective back view of the assembled casing assembly 300 with device 320 secured therein, in accordance with a system and method of the present invention. As shown, device 320 is positioned securely within casing assembly 300 such that when the POV video mounting system is in operation, device 320 does not rattle within the assembly 300. Accordingly, casing assembly 300 protects device 320 from effects of vibration when the POV video mounting system is attached to a surface moving at high speeds. Moreover, when device 320 is assembled within casing assembly 300, its back side is flush with the inside surface (back side) of back casing plate 330. In addition, its front side is flush with the inside surface (back side) of front casing palate 310 when device 320 is assembled.

Further, FIG. 3B shows attached latch assembly 323 which comprises latch extensions 322a, 322b of latch extension components 322 snap fitted within latch slots 321a, 321b of latch slot components 321. In an embodiment, latch assembly 323 and hinges 312 collectively provides a locking mechanism for casing assembly 300. As such, when latch assembly 323 is engaged, the assembly 323 and hinges 312 collectively secures and encloses device 320 within the assembly 300.

In addition, when assembled, casing assembly 300 provides an impact resistant, water tight assembly such that device 320 is protected when the POV video mounting assembly is in operation. As such, when assembled, assembly 300 secures, encloses, and fits device 320 therein.

Additionally, FIG. 3B shows that device 320 is visible through the back side of casing assembly 300. More specifically, a portion of front casing plate 310 is visually transparent such that a user can see through plate 310 to the video display 315 of device 320 when the device 320 is secured within the casing assembly 300. As shown, home screen button 314 and video display 315 are both visible through front casing plate 310 when device 320 is secured within the casing assembly.

FIG. 3B further illustrates that front casing plate 310 and back casing plate 330 connect via hinges 312. Particularly, hinges 312 serve to fasten the casing assembly 300 together when device 320 is secured therein. As shown, all of the hinges 312 of front casing plate 310 and back casing plate 330 are aligned when the casing assembly is assembled such that a rod (not shown) can be used to maintain the alignment of the hinges 312 help the casing assembly stay fastened together. It should be understood that the present invention is not limited to any particular hinge configuration but can accommodate any device configuration which can couple and help fasten the casing assembly together.

In addition, FIG. 3B shows that j-hook 326 is adjacent to two pairs of hinges 312. In an embodiment, j-hook 326 serves to couple the casing assembly to the mounting hub. Accordingly, the mounting hub includes a component which conforms to j-hook 326 such that the hub can couple to the casing assembly, described in more detail below.

In an embodiment, casing assembly 300 provides a hermetic and water-resistant seal to provide protection for device 320 from ambient conditions while in operation. For example, in an event that a motorcycle rider dons a helmet with a POV video mounting system mounted thereto, the device 320 may be protected from environmental effects such as wind, dirt, water, sunlight, etc. Further, in an embodiment, casing assembly 300 is water-resistant to a depth of 1 m in water. Accordingly, casing assembly 300 protects device 320 from ambient conditions such that the device 320 reliably performs despite exposure to unfavorable environmental conditions.

Moving forward, FIGS. 4A-4D illustrate front, back, side, and top views of the back casing plate 430 of the casing assembly. For example, FIG. 4A is an illustration of a back view of back casing plate 430 in accordance with a system and method of the present invention. The displayed back view of back casing plate 430 shows hinges 412 and j-hook 426 extending from the base 416 of back casing plate 430. In addition, back casing plate 430 includes an optically clear area 411 such that a lens component of the device adjacent to area 411 is exposed. Furthermore, a gasket 415 may be meshed within the grooves of base 416 near the perimeter of the back casing plate 430 to help seal the casing assembly together.

FIG. 4B is an illustration of a front view of the back casing plate 430, in accordance with a system and method of the present invention. As shown, hinges 412 and j-hook 426 extend from the front of back casing plate 430. In addition, FIG. 4B illustrates back lens area 417 which is configured to be adjacent to the device. FIG. 4B further shows that back lens area 417 is secured to back casing plate 430 via screws 425. Therefore, back lens area 417 can be removed from back casing plate 430 such that a wide area lens can be fitted therein to capture a wide area view.

Moreover, back lens area 417 includes an optically clear area 411 within its perimeter which exposes a back lens of the device. In an embodiment, back lens area 417 is large in relation to optically clear area 411. Accordingly, the large area of back lens area 417 enables the casing assembly to accommodate the fitting of a fish eye or alternative wide angle lens therein. It should be understood, however, that the present invention is not limited to a circularly-shaped optically clear area 411 or back lens area 417. As such, optically clear area 411 and back lens area 417 can be any shape so long as optically clear area 411 remains transparent and back lens area 417 is removable such that a wide angle lens may be fitted in its place.

FIG. 4C is an illustration of a side view of back casing plate 430 in accordance with a system and method of the present invention. As shown, hinges 412 are shown extending from the base 416 of back casing plate 430.

FIG. 4D provides a illustration of a top view of the back casing plate 430 in accordance with a system and method of the present invention. As shown, j-hook 426 and hinges 412 are located at the bottom center of the base 416 of back casing plate 430.

Figure 5B:
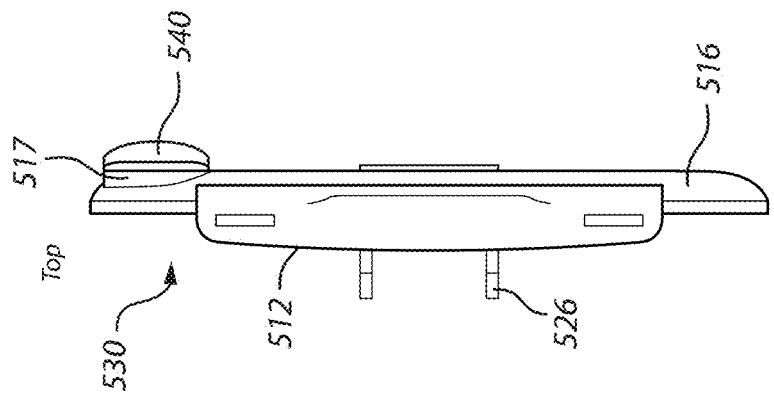
FIG. 5B illustrates a top view of the back casing plate with a fisheye lens attached thereto, in accordance with a system and method of the present invention.
Figure 5A:
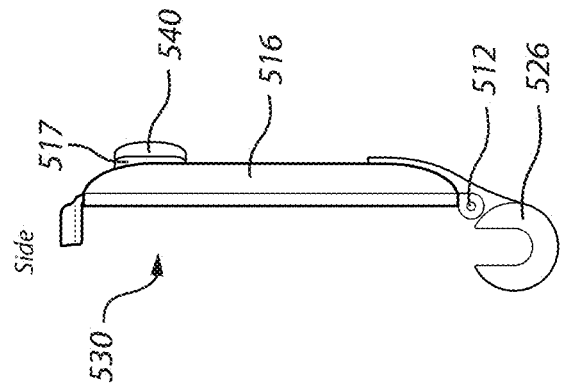
FIG. 5A illustrates a side view of the back casing plate with a fisheye lens attached thereto, in accordance with a system and method of the present invention.

Moving forward, FIG. 5A is an illustration of a side view of back casing plate 530 with a wide area lens 540 attached thereto, in accordance with a system and method of the present invention. In an embodiment, wide area lens 540 is a fisheye lens, which is a wide-angle lens that takes in an extremely wide hemispherical image. When wide-angle lens 540 may be any of various fisheye lens such as, but not limited to a circular fisheye lens and full-frame fisheye lens.

FIG. 5A further illustrates, that wide area lens 540 may be used to capture a wide area of view, more than the area typically captured by a conventional camera lens. Furthermore, wide area lens 540 may be attached to the casing assembly as shown in FIG. 5A. In addition, FIG. 5A shows other components of back casing plate 530 (hinges 512, base 516, and j-hook 526) when the wide area lens 540 is attached to the casing assembly (back casing plate 530).

FIG. 5B is an illustration of a top view of the back casing plate 530 with a wide area lens 540 attached thereto, in accordance with a system and method of the present invention. As shown, wide area lens 540 extend throughout the entire region from which the back lens area formerly occupied.

Continuing through the figures, FIGS. 6A-6D illustrate front, back, side, and top views of front casing plate 610 of the casing assembly. For example, FIG. 6A is an illustration of a front view of front casing plate 610 in accordance with a system and method of the present invention. The displayed front view of front casing plate 610 shows hinges 612 extending from the base 616 of front casing plate 610. Hinges 612 of front casing plate 610 are aligned with the hinges of the back casing plate (supra) so that the casing assembly can fasten to secure the device fitted therein.

Furthermore, FIG. 6A illustrates a frame 608 surrounding the perimeter of a clear membrane 618 near the center on the front of front casing plate 610. In an embodiment, frame 608 with an inner chamfered edge 619 along the edge of clear membrane 618. Clear membrane 618 is transparent which allows a user to view the video display of the device enclosed within the casing assembly. In an embodiment, clear membrane 618 allows a user to use a touch screen feature of the video display of the enclosed device. In addition, front casing plate 610 includes a home screen button area 614 such that a user can activate the home screen button of the device within the casing assembly.

FIG. 6A further illustrates that front casing plate 610 includes an additional optically clear area 620. In an embodiment of the present invention, additional optically clear area 620 accommodates a second forward-facing lens secured within the casing assembly. For example, optically clear area 620 may accommodate a wide-area lens. As such, a second forward-facing lens can be assembled within the casing assembly such that the second forward-facing lens is exposed by the additional optically clear area 620. For example, when the second forward-facing lens is assembled within the casing assembly, the user can be recorded while in action. As such, the POV video mounting system of the present invention can accommodate multiple lens such that multiple views of a user's experience may be recorded.

Next, FIG. 6B is an illustration of a back view of the front casing plate 610 in accordance with a system and method of the present invention. As shown, FIG. 6B shows the back view of some of the components displayed in FIG. 6A. For example, FIG. 6B shows the back side of base 616, hinges 612, and clear membrane 618. In addition, additional optically clear area 620 and home screen button area 614 are shown. In an embodiment, the backside of home screen button area 614 is slightly enlarged and domed to give a user easier contact to the home screen button of the device.

Moving forward, FIG. 6C is an illustration of a side view of the front casing plate 610 in accordance with a system and method of the present invention. As shown, front casing plate 610 includes a base 616 from which hinge 612 extends. In an embodiment, hinge 612 extends from the bottom of base 616 at an angle. In the embodiment, hinge 612 extends at an angle of 55 degrees.

Finally, FIG. 6D is an illustration of a top view of the front casing plate 610 in accordance with a system and method of the present invention. As shown, hinges 612 are each disposed equidistant from the edge of the base 616 of front casing plate 610. In an embodiment, hinges 612 are disposed along the edge of front casing plate 610 such that they pair up with the hinges on the back casing plate (supra) when the casing assembly is assembled.

Figure 7:
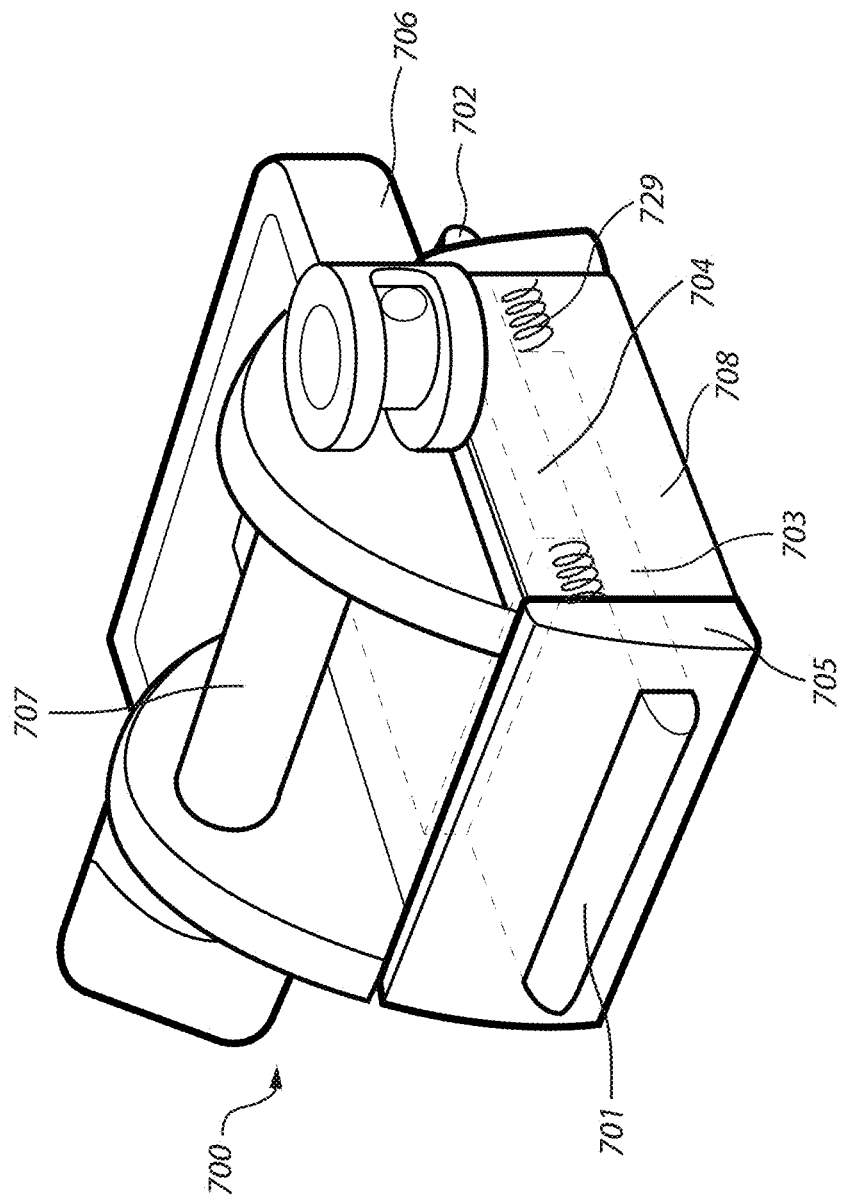
FIG. 7 illustrates a mounting hub in accordance with a system and method of the present invention.

Next, FIG. 7 is an illustration of a mounting hub 700 in accordance with a system and method of the present invention. As shown, mounting hub 700 includes a coupling bar 707, which allows the hub 700 to couple to the casing assembly. In an embodiment, the j-hook component, which extends from the back casing plate (supra), connects to the coupling bar 707 of the mounting hub 700 such that the hub 700 is connected to the casing assembly. It should be understood that the present invention is not limited to the j-hook/coupling bar configuration and that any configuration which allows the casing assembly to connect to the mounting hub is in the spirit and scope of the present invention.

Further, mounting hub 700 includes a mounting base 708 from which spring-loaded members 703, 704 extend there from. In an embodiment, a pair of spring-loaded members 703, 704 extends from the lateral ends 705 of mounting base 703. However, it should be understood that the present invention is not limited to any specific number of spring-loaded members For example, one, two, or more spring-loaded members may extend from mounting base 708 so long as when engaged the mounting hub 700 rotates in an angular direction about a first axis 709 desired by the user.

In an embodiment, spring-loaded members 703, 704 include push edges 701, 702, respectively, which are shaped such that a user can apply force to the edges 701, 702 against the resistance of the springs to push the members 703, 704 within mounting base 708. By pushing spring-loaded members 703, 704 within mounting base 708, a user has the ability to rotate mounting hub 700 to a desired angular position about a top hat component (infra) coupled thereto. Accordingly, spring-loaded members 703, 704 provide a first locking mechanism to fix the POV video mounting system in a desired angular position.

The mounting hub 700 may be configured such that it is light weight, but durable to withstand repetitive user handling and able to mount the casing assembly. As such, the consistency of push edges 701, 702 may include metal, whereas the consistency of the remaining portions of spring-loaded members 703 and 704 may include plastic. In yet another embodiment, the consistency of mounting base 708 includes plastic.

In an embodiment, when spring-loaded members 703, 704 are not engaged, members 703, 704 serve as a first locking mechanism for the mounting hub 700 with respect to an angular position. As such, mounting hub 700 is locked in an angular position unless a user engages spring-loaded members 703, 704. It should be understood that the present invention is not limited to a spring-loaded member configuration to provide a locking mechanism for the POV video mounting system described herein. Accordingly, any locking mechanism which can be utilized such that a user can rotate a mounting hub when engaged and locked in place when the locking mechanism is disengaged, is in the spirit and scope of the present invention.

In addition, FIG. 7 helps illustrate the functionality of the second locking mechanism. As shown, second locking mechanism is engaged when a user sets locking bar member 706 in a locked position 742. In an embodiment, locked position 742 may be characterized as when locking bar member 706 contacts mounting base 708. In an embodiment, the second locking mechanism operates such that when the second locking mechanism is in the locked position 742, the casing assembly is locked in place with respect to movement about the second axis 711. As such, when the second locking mechanism is in the locked position 742, the casing assembly is locked in place about the second axis 711, but, mounting hub 700, however, may rotate about the first axis 709 when the first locking mechanism is disengaged by the user. It should be understood that the first axis is different than the second axis about which the casing assembly moves back and forth, as described above.

Alternatively, when locking bar member 706 is in an unlocked position 743, the casing assembly can rotate back and forth about the second axis 711, as desired by a user. In an embodiment, the unlocked position 743 may be characterized as to when locking bar member 706 is rotated at its maximum point away from the mounting base 708. In the embodiment, locking bar member 706 is above coupling bar 704 when in the unlocked position 743. Accordingly, locked position 742 may be characterized as engaging the second locking mechanism, whereas unlocked position 743 may be characterized as disengaging the second locking mechanism, as described above.

It should be understood that the present invention is not limited to the displayed second locking mechanism configuration. As such, any locking configuration which can be utilized such that the casing assembly can move back and forth about an axis when the locking mechanism is disengaged and locked in place when the locking mechanism is engaged, is in the spirit and scope of the present invention.

Moving on through the figures, FIG. 8A is an illustration of a perspective view of spring-loaded members 803, 804, in accordance with a system and method of the present invention. As shown, spring-loaded members 803, 804 are side by side with spring-loaded member 803 displaced a distance more to the left than spring-loaded member 804. It should be understood that in operation, spring-loaded member 803 is beneath member 804 within the mounting hub, according to the embodiment previously shown in FIG. 7.

In an embodiment, spring-loaded members 803, 804 include edge areas 801, 802, respectively, which a user presses against to disengage the first locking mechanism to rotate the mounting hub. In addition, spring-loaded members 803, 804 also include cavities 851, 853 through which a flange portion of the "top hat" component (infra) can fit there through. In an embodiment, cavities 851, 853 are shaped in a semi-circular fashion oriented 180 degrees of each other. Furthermore, spring-loaded members 803, 804 include rows of teeth 850, 852 which clench a flange portion of the "top hat" component together when the first locking mechanism is engaged.

FIG. 8B is a top cross-sectional view of the spring-loaded members 803, 804 when the first locking mechanism is engaged. As shown, spring-loaded members 803, 804 are within mounting base 808 with edge areas 801, 802 extending there through. In an embodiment, when the first locking mechanism is engaged, the mounting hub is locked in a particular angular position. Furthermore, when the first locking mechanism is engaged, the cavities of spring-loaded members 803, 804 form a cavity 865 through which a flange portion of the "top hat" component is clenched therein.

In an embodiment, when the first locking mechanism is engaged, cavity 865 has a width 861. In an embodiment, the width 861 of cavity 865 may be characterized as the distance between rows of teeth 850, 852 of spring-loaded members 803, 804 respectively. The width 861 of cavity 865 may be of any sufficient length such that the rows of teeth 850, 852 adequately clench the flange portion of the "top hat" component (infra). For example, the length of width 861 may range from 0.15-0.30 inches. In an embodiment, the length of width 861 depends upon how much of the body of spring-loaded members 803, 804 are within the mounting hub. As such, when the first locking mechanism is disengaged, more of the body of spring-loaded members 803, 804 extend within the mounting hub than when the first locking mechanism is engaged.

In addition, when the first locking mechanism is disengaged, spring-loaded members 803, 804 extend from out of the mounting hub a distance 862. In an embodiment, the distance 862 that spring-loaded members 803, 804 extend from out of the mounting hub may be characterized by the length of edge areas 801, 802. For example, distance 862 may be defined as the length from the outer edge of edge areas 801, 802 respectively, of which the user makes contact to push in the spring-loaded members 803, 804, to the side walls 871, 872.

In an embodiment, spring-loaded members 803, 804 distances 861, 862 have approximately the same length. Accordingly, width 861 and distance 862 change according to the engagement state of the first locking mechanism. As such, the length of width 861 is greatest when the first locking mechanism is disengaged. Alternatively, the length of distance 862 is greatest when the first locking mechanism is engaged.

FIG. 8C is a top cross-sectional view of the spring-loaded members 803, 804 when the first locking mechanism is disengaged. As shown, edge areas 801, 802 are pushed in such that the full bodies of spring-loaded members 803, 804 are within the mounting base 808 of the hub. In addition, edge areas 801, 802 are flush with the side walls 871, 872 of the mounting base 808. As such, when the first locking mechanism is disengaged, distance 862 is non-existent. In other words, since the edge areas 801, 802 are flush with side walls 871, 872, the length of distance 862 is negligible or approximately zero, as shown.

In addition, when the first locking mechanism is disengaged, cavity 865 has its maximum length. As shown, the length 861 of cavity 865 in FIG. 8C is greater than the length 861 shown in FIG. 8C. In an embodiment, when the first locking mechanism is disengaged, the length 861 of cavity 865 is greater than the width of the flange of the "top hat" component. As such, when the second component is disengaged, the length 861 of cavity 865 is such that a user of the POV video mounting system can rotate the mounting hub about the "top hat" component.

FIG. 8D is a side cross-sectional view of the spring-loaded members 803, 804 when the first locking mechanism is disengaged. As shown, spring-loaded member 803 is adjacent to, but beneath and displaced a distance to the left of spring-loaded member 804. Furthermore, spring-loaded members 803, 804 each abut springs 829, respectively, such that a user can apply force to edge areas 801, 802 to push the spring-loaded members 803, 804 within mounting base 808 against the resistance of the springs 829.

Figure 9B:
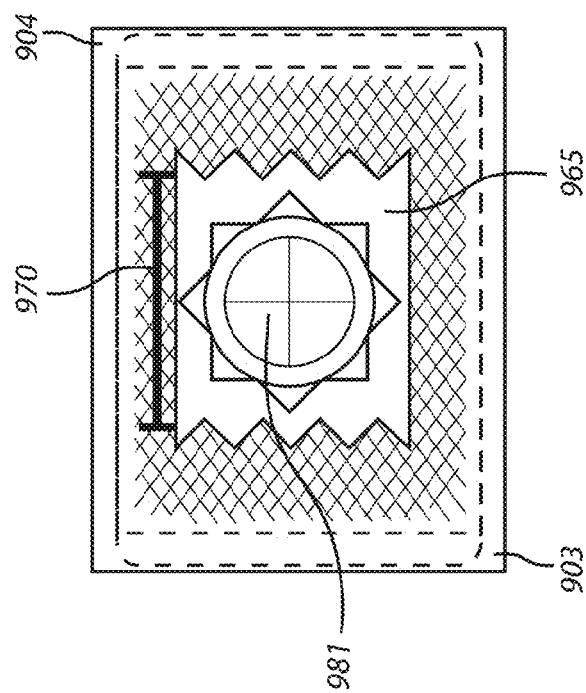
FIG. 9B is a top cross-sectional view of the spring-loaded members with the flange of the top hat component un-clenched within the cavity in accordance with a system and method of the present invention.
Figure 9A:
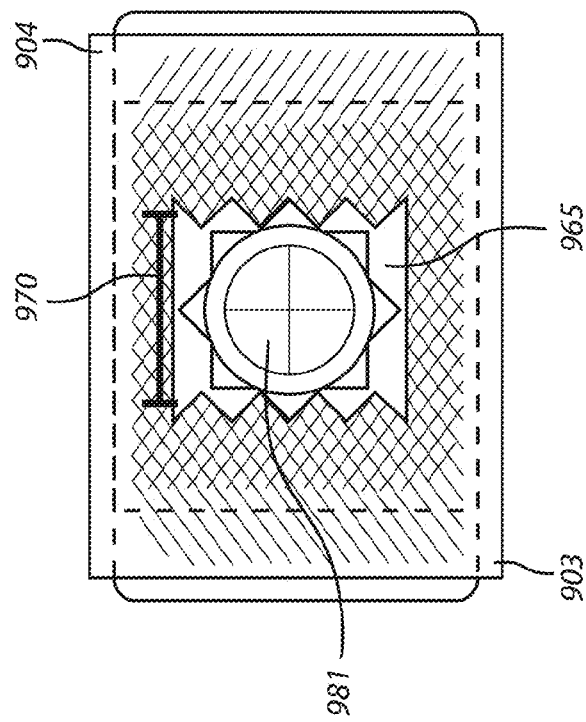
FIG. 9A is a top cross-sectional view of the spring-loaded members with the flange of the top hat component clenched therein when the first locking mechanism is engaged, in accordance with a system and method of the present invention.

Continuing on through the figures, FIG. 9A is a top cross-sectional view of spring-loaded members 903, 904 with a flange 970 of the top hat component clenched therein when the first locking mechanism is engaged, in accordance with a system and method of the present invention. As shown, flange 970 is clenched within cavity 965 such that the distance 961 between rows of teeth 950, 952 is approximately the width of flange 970. In an embodiment of the present invention, flange 970 includes ridges 981 which correspond with teeth 950, 952. For example, when the first locking mechanism is engaged, some of the teeth 950, 952 fit within ridges 981 of flange component 970. Accordingly, FIG. 9A shows a top cross-sectional view of spring-loaded member 903, 904 with the flange 970 clenched in cavity 965 therein when the first locking mechanism is engaged.

Alternatively, FIG. 9B is a top cross-sectional view of the spring-loaded members 903, 904 with the flange 970 of the top hat component unclenched within the cavity, in accordance with a system and method of the present invention. As shown, when the first locking mechanism is disengaged, the distance 961 between rows of teeth 950, 952 is greater than the width of flange 970 of the "top hat" component. Additionally, FIG. 9B shows that when the first locking mechanism is disengaged, teeth 950, 952 are not fitted within the individual ridges 981 of the top hat component.

Figure 10:
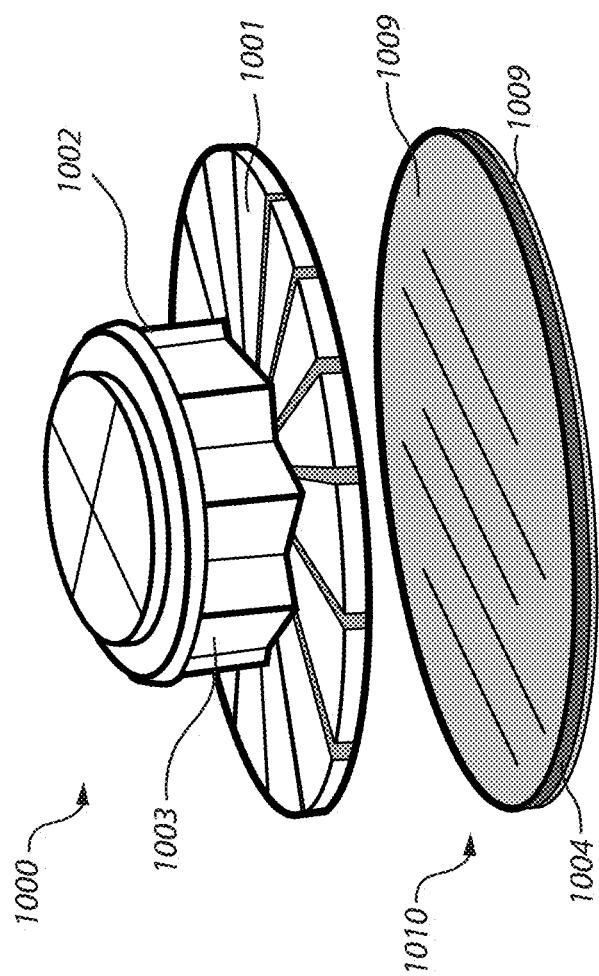
FIG. 10 illustrates a top hat component above a foam tape pad in accordance with a system and method of the present invention.

Moving through the figures, FIG. 10 is an illustration of a top hat component 1000 above a foam tape pad 1010 in accordance with a system and method of the present invention. As described, top hat component 1000 couples to the mounting hub through a flange component 1002 extending from the center of the top hat component 1000. In an embodiment, the mounting hub includes a gaping portion (supra) through which the flange 1002 component is clenched therein. As described above, when the first locking mechanism is disengaged, the mounting hub can rotate about the flange 1002 of the top hat component 1000. In an embodiment, when the first locking mechanism is disengaged, the teeth of the spring-loaded members are released from the ridges 1003 of flange 1002.

In addition, FIG. 10 illustrates that top hat component 1000 includes a plurality of connected feathered-shaped extensions 1001. As shown, top hat component 1000 is configured such that the connected feathered-shaped extensions 1001 form a circularly-shaped top hat component 1000. Accordingly, when the POV video mounting system is assembled, the feathered-shaped extensions 1001 enable the system to be mounted on various terrains. For example, feathered-shaped extensions 1001 enable POV video mounting systems of the present invention to be mounted on even and uneven terrains. In an embodiment, the base of the top hat component is elliptical in shape allowing it to be mounted in narrow spaces while providing enough surface area to adhere properly.

It should be understood that the present invention is not limited to a top hat component with feathered-shaped extensions. As such, the top hat component can be configured in any way such that the component allows a mounting hub to rotate and allow the POV video mounting system to mount to even and uneven terrains.

Furthermore, FIG. 10 shows foam tape pad 1010 beneath top hat component 1000. In an embodiment, an adhesive layer 1009 is disposed on the top and bottom of the base 1004 of the pad 1010. In the embodiment, an adhesive layer 1009 bonds to the top of base 1004 of top hat component 1000. In addition, adhesive layer 1009 on the bottom side of the base 1004 bonds to a surface desired by a user.

Foam tape pad 1010 may be of any type such that it enables the POV video mounting system to mount securely upon a surface. Foam tape pad 1010 may be chosen according to performance metrics such as dynamic shear. In an embodiment, foam tape pad 1010 may have a dynamic shear value in the range of 40-140 pounds per square inch (psi). For example, 3M Corporation® sells foam pads of varying performance characteristics such as the 3M Double Coated Removable Foam Tape 4451, a double coated foam tape pad made of polyethylene which features a dynamic shear value of 140 psi. As such, 3M Corporation's Foam Tape 4451 is suitable for use within the POV video mounting system described herein. Moreover, vinyl and urethane foam pads may be suitable substitutes so long as the dynamic shears of the pads exceed 40 psi.

It should be understood that the present invention is not limited to double coated removable foam tape pads. Accordingly, the foam tape pad of the present invention can also accommodate single-sided adhesive pads and this would be in the spirit and scope of the present invention.

Figure 11:
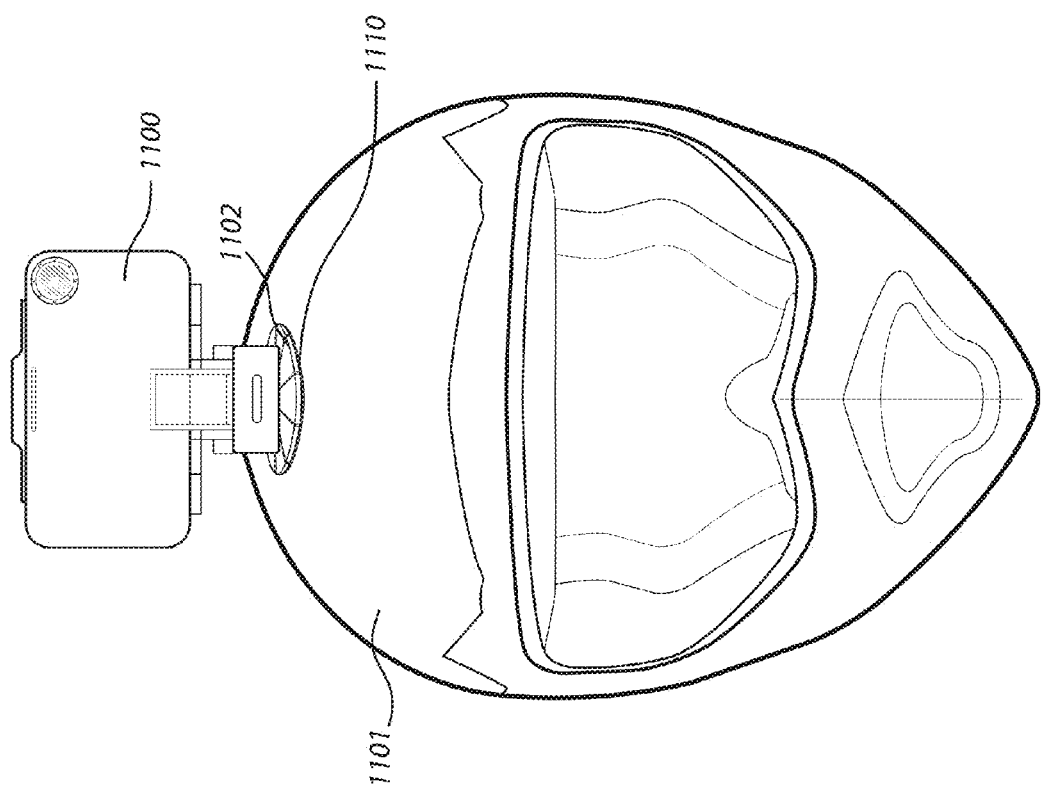
FIG. 11 illustrates a POV video mounting system coupled to a helmet in accordance with a system and method of the present invention.

The POV video mounting system of the present invention described herein can be attached to sporting equipment and paraphernalia. For example, FIG. 11 provides an illustration of a POV video mounting system 1100 coupled to a helmet 1101, in accordance with a system and method of the present invention. As shown, POV video mounting system 1100 is mounted to helmet 1101 via top hat component 1102. It should be understood that the POV video mounting system of the present invention is not limited to any particular location on the helmet 1101. As such, any location on the helmet upon which the POV video mounting system 1000 is attached which allows the system to reliably capture video recording of a user's performance is within the spirit and scope of the present invention. In addition, multiple POV video mounting systems 1100 may be mounted to helmet 1101 and this would also be in the spirit and scope of the present invention.

Figure 12:
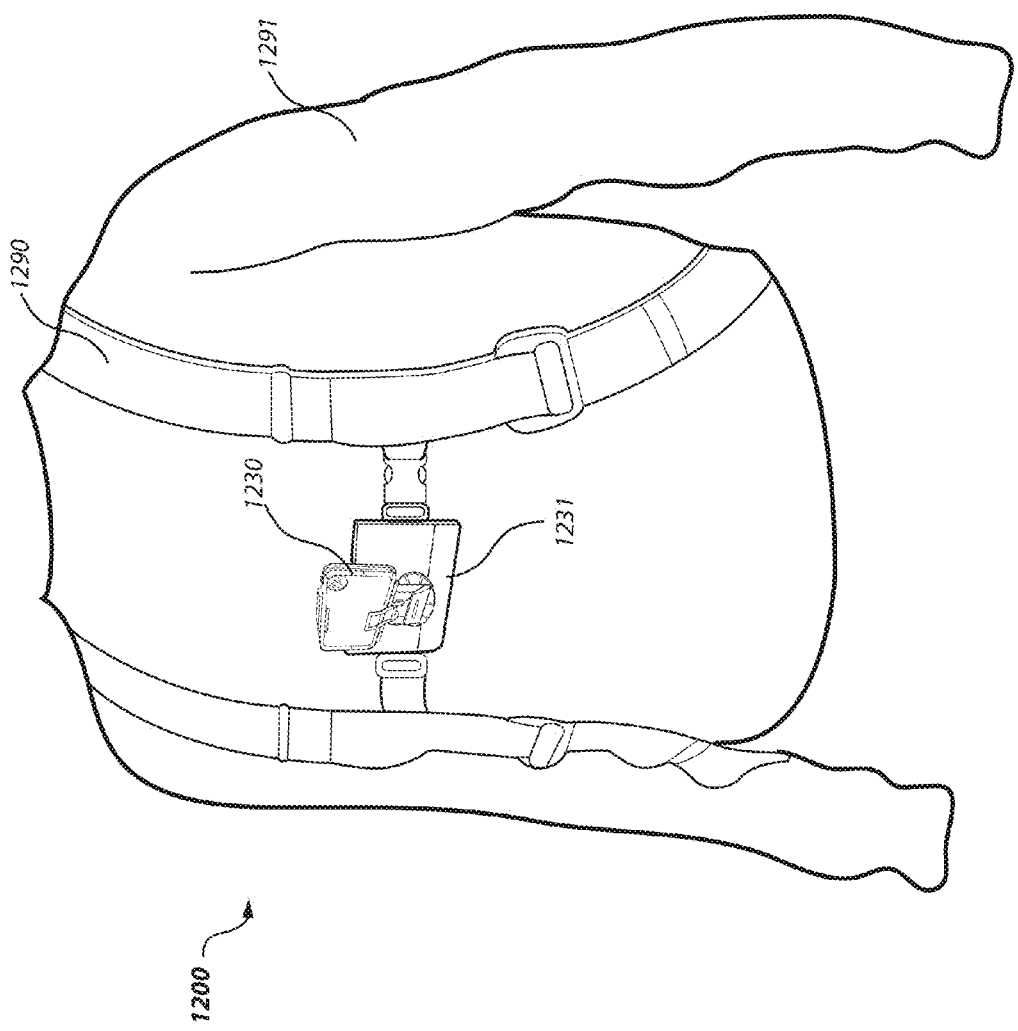
FIG. 12 illustrates a perspective view of a POV video mounting system coupled to a chest mount in accordance with a system and method of the present invention.

FIG. 12 illustrates a perspective view of a POV video mounting system 1230 coupled to a chest mount 1231 in accordance with a system and method of the present invention. As shown, chest mount 1231 includes chest straps 1290 which are to be suspended from a user's torso 1291. Chest mount 1231 further includes a mounting base of which a POV mounting system 1230 is mounted thereto. In operation, chest mount 1231 can support a POV mounting system 1230 coupled thereto to record and display a user's real time performance, performance metrics, and other useful information.

In addition, FIG. 13 illustrates a perspective view of a casing assembly 1330 coupled to a wrist mount 1300 in accordance with a system and method of the present invention. As shown, casing assembly 1330 is coupled to wrist mount 1300 via locking strap 1332.

As shown, once, the casing component 1330 is latched, a user can don the wrist mount 1300 by wrapping the strap 1335 around the user's arm, then weaving the strap 1302 through buckle 1309, and finally connecting the front side of the strap 1335 against the back side of strap 1302 via velcro 1331 disposed on the strap 1302.

Accordingly, a wrist mount 1300 with a POV video mounting system 1330 coupled thereto provides a way for users to record their performance in real time while participating in sporting activities. Additionally, users can select which images get recorded by moving the POV device 1330 to capture any desired images.

A POV video mounting system has been described. It will be understood by those having ordinary skill in the art that the present invention may be embodied in other specific forms without departing from the spirit and scope of the invention disclosed. In addition, the examples and embodiments described herein are in all respects illustrative and not restrictive. Those skilled in the art of the present invention will recognize that other embodiments using the concepts described herein are also possible.

The invention claimed is:

1. An apparatus, comprising:
   a casing assembly to contain an electronic device between a front casing plate and a back casing plate,
   wherein said electronic device comprises a camera;
   wherein said front casing plate is detachable from or hinged to said back casing plate;
   wherein said casing assembly comprises a first optically clear area in front of an aperture of said camera;
   wherein said first optically clear area comprises a fitting component to receive an interchangeable lens and align said interchangeable lens to said aperture, thus configuring said camera to capture images of external objects through said interchangeable lens;
   a mounting assembly comprising a mounting hub and a top-hat assembly,
   wherein said mounting hub is coupled to said casing assembly;
   wherein said top-hat assembly comprises a flange and a plurality of flexible extensions radiating from a first end of said flange;
   wherein a second end of said flange is inserted into a gaping portion of said mounting hub;
   wherein unlocking said gaping portion from said flange allows adjustment of a first angle of said casing assembly by rotating said mounting hub around a first axis; and
   wherein locking said gaping portion to said flange locks said first angle of said casing assembly;
   wherein said mounting hub comprises a mounting base and a locking bar;
   wherein positioning said locking bar in a first orientation allows adjustment of a second angle of said casing assembly by rotating said casing assembly around a second axis;
   wherein positioning said locking bar in a second orientation locks said second angle of said casing assembly; and
   wherein said first axis is different from said second axis.

2. The apparatus of claim 1, wherein said casing assembly includes a transparent portion through which a display portion of said electronic device is visible from outside said assembly.

3. The apparatus of claim 1, wherein said mounting assembly includes an adhesive component to affix said mounting assembly to a mobile surface.

4. The apparatus of claim 1, wherein said mounting assembly includes a first locking mechanism:
   wherein the first locking mechanism comprises a spring-loaded member that locks automatically when a user ceases to apply force.

5. The apparatus of claim 1, wherein said flexible extensions are bent to conform to a helmet surface, thereby coupling said mounting assembly to said helmet.

6. The apparatus of claim 1, wherein said casing assembly hermetically seals said electronic device.

7. The apparatus of claim 1, wherein said flexible extensions are feathered-shaped.

8. The apparatus of claim 1, wherein said casing sleeve comprises features to accommodate a plurality of different types of electronic device including smart-phones or portable music players.

9. The apparatus of claim 1 wherein a base of said top-hat, assembly has an elliptical footprint.

10. The apparatus of claim 1 further comprising a spring-loaded member having a row of teeth, wherein said teeth clench said flange during said locking of said portion to said flange.

11. The apparatus of claim 1 further comprising a second optically clear area to accommodate an additional interchangeable lens in front of an additional camera aperture of said electronic device.

12. A point-of-view video recording system, comprising:
   a casing assembly comprising a front casing plate, a back casing plate, a transparent portion, and a first optically clear area;
   wherein said casing assembly is configured to hold said electronic device between said front-casing plate and sail back-casing plate
   said display visible through said transparent portion and said camera aimed through said first optically clear area;
   a mounting hub coupled to a connection component of said casing assembly, wherein said mounting hub comprises:
   a mounting base;
   a first locking mechanism unlockable to allow adjustment of a casing assembly angle around a first rotation axis in response to an applied force to a part of said first locking mechanism, and lockable to hold said casing assembly at said casing assembly angle with respect to said first rotation axis in said absence of said applied force; and a top-hat component between said mounting hub and an environmental surface supporting said point-of-view recording system, wherein said top-hat component comprises:
- a flange extending from a center of said top-hat component into a gaping portion of said mounting hub to locate said first rotation axis;
- a plurality of individual extensions radiating from an end surface of said flange opposite said mounting hub;
- wherein said connected extensions are flexible, enabling said top-hat component to be affixed to uneven or even terrain of said environmental surface; and
- an interchangeable lens attached to said first optically clear area of said casing assembly and aligned to said camera to capture images of objects outside said casing assembly.

13. The point-of-view video mounting system of claim 12, wherein a foam tape adhesive is disposed on the bottom side of said mounting hub.

14. The point-of-view video mounting system of claim 12, wherein said first locking mechanism comprises spring-loaded teeth clenching said flange to restrict said casing assembly from rotating when said first locking mechanism is engaged.

15. The point-of-view video mounting system of claim 12, further comprising a second locking mechanism which prevents said electronic device from moving in a backward or forward direction when said second locking mechanism is engaged.

16. The point-of-view video mounting system of claim 12 further comprising an additional interchangeable lens attached to a second optically clear area of the casing assembly.

17. The point-of-view video mounting system of claim 12 wherein said connection component of said casing assembly comprises a j-hook, and wherein said mounting hub comprises a coupling rod conforming to said j-hook.

18. A method, comprising:
- affixing a plurality of individual extensions of a top-hat component to an even or uneven terrain of a mobile surface;
- inserting a flange of said top-hat component into a gaping portion of a base of a mounting hub;
- coupling said mounting hub to a casing assembly;
- coupling an interchangeable lens to a first optically clear area of said casing assembly;
- inserting an electronic device having a camera into said casing assembly such that an aperture of said electronic device is adjacent to said interchangeable lens;
- unlocking a first locking mechanism of said mounting hub;
- adjusting a rotation angle of said casing assembly around a first axis;
- locking said first locking mechanism;
- unlocking a second locking mechanism of said mounting hub;
- adjusting a rotation angle of said casing assembly around a second axis different from said first axis;
- locking said second locking mechanism; and
- utilizing said interchangeable lens as part of an optical train of said camera to capture images of objects external to said casing assembly.

19. The method of claim 18, wherein said mounting assembly mounts to said mobile surface through the use of an adhesive material.

20. The method of claim 18, wherein setting said casing assembly to said desired angle includes applying force to edges of a set of spring-loaded members.

* * * * *